Jan. 15, 1957 W. A. McRAE ET AL 2,777,811
TREATMENT OF ELECTROLYTIC SOLUTIONS
Filed Jan. 5, 1953
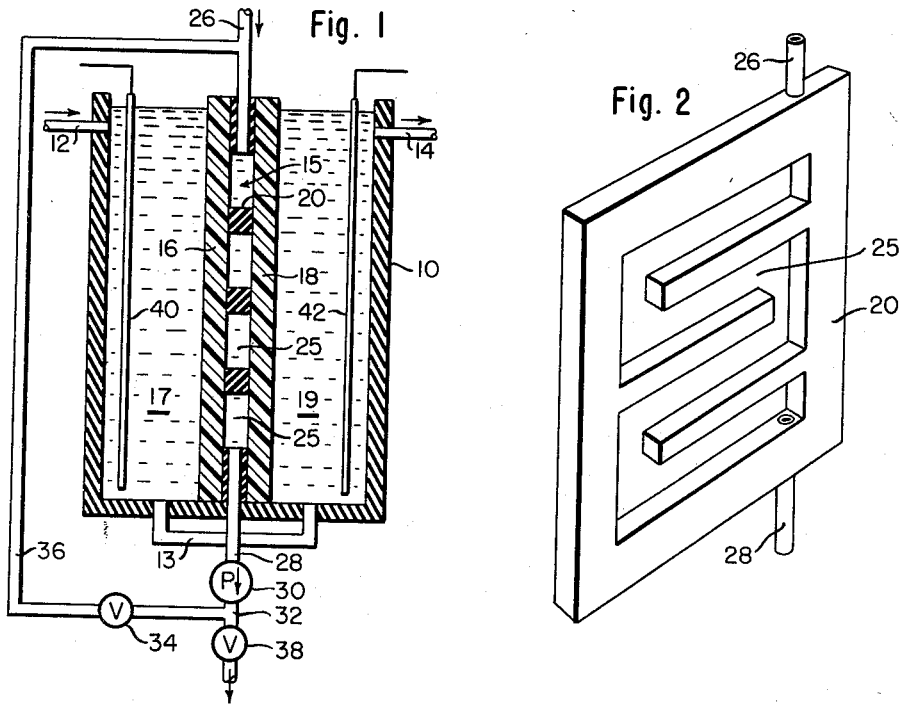
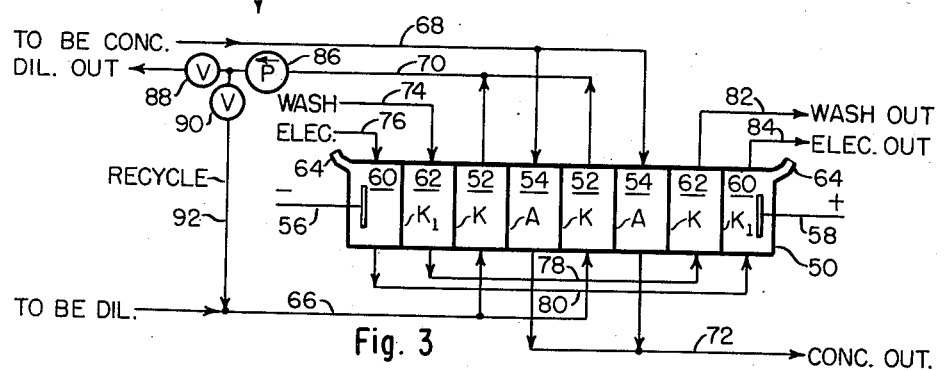
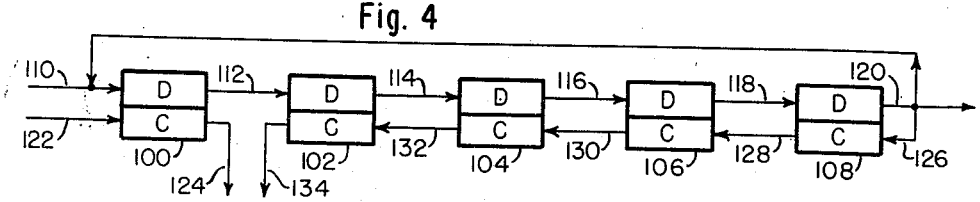
*INVENTOR.*
WAYNE A. McRAE
BY
ATTORNEYS

United States Patent Office 2,777,811
Patented Jan. 15, 1957

2,777,811

TREATMENT OF ELECTROLYTIC SOLUTIONS

Wayne A. McRae, Arlington, and Norman W. Rosenberg, Newton, Mass., assignors to Ionics, Incorporated, Cambridge, Mass., a corporation of Massachusetts Application January 5, 1953, Serial No. 329,639

11 Claims. (Cl. 204—151)

This invention relates to processes employing electrical energy to effect the migration of ions from one solution to another across an ion permeable barrier separating the solutions and consists in improvements to such processes and apparatus therefor.

In general, in the processes to which this invention relates a chamber defined between a pair of selectively permeable membranes, one anion permeable and the other cation permeable, is fed with an electrolytic solution and a direct electric current is passed in series across the membranes and solution in the direction to cause anions from the solution to migrate to and through the anion permeable membrane and cations to migrate to and through the cation permeable membrane. One or more solutions contacting the outboard surfaces of the membranes are provided to receive the outwardly migrating ions. Such apparatus and processes are described in the copending application of Walter Juda and Wayne A. McRae, Serial No. 146,706 filed February 28, 1950, now Patent No. 2,636,852.

In preferred operations the apparatus takes the form of a cell unit, having a set of diluting chambers (each corresponding to the chamber described above) alternately disposed between a set of concentrating chambers and separated therefrom by alternating anion and cation permeable membranes. The solution from which dissolved electrolyte is to be removed is fed through the diluting chambers while a solution to receive the electrolyte is passed through the surrounding concentrating chambers, and the electric current is passed in the direction to cause the anions and cations of the dissolved electrolyte to pass out of the diluting chambers. Such cell units, and preferred methods of constructing them are fully described in the copending application of William E. Katz and Norman W. Rosenberg, Serial No. 300,302, filed July 22, 1952, and desirable improvements thereto are described in the copending application of Norman W. Rosenberg, Serial No. 299,592, filed July 18, 1952, now Patent No. 2,708,658. A desirable feature of such cell units is close spacing of the membranes to minimize the ohmic resistance of the solutions contained between them.

In the operation of such deionization or demineralization cells, it has been found that a number of factors limit the efficiency of operation. Selectively permeable membranes become less selectively permeable when in contact with solutions of increasing electrolyte concentration with the result that at high concentrations anions migrate into the diluting chambers through the cation permeable membranes and cations through the anion permeable membranes, thus impairing the current efficiency. Secondly, if the current density is high (relative to the salt concentration of the solution to be desalted) there apparently forms in the diluting chambers in the vicinity of the membrane surface a region depleted in salt. This condition is referred to as polarization and results in an increase in the resistance of the cell and eventually in the extreme in decreased current efficiency for desalting.

In many cases, it is desirable to operate the demineralization apparatus at relatively high rates to decrease the size of equipment necessary. To accomplish this, it is necessary to increase the density of the current passing through the apparatus. It is in the region of high current density (relative to the salt concentration of the solution to be desalted) that polarization and the accompanying increased resistance and decreased current efficiency occur. It has been found that by increasing the velocity of the flowing solution, higher current densities (relative to solution concentration) may be obtained without incurring polarization than would otherwise be possible.

The small intermembrane spacing necessary to decrease electrical resistance of such units is conducive to the settling out of sediment, scale, etc. found in small quantities in the feed solution, even when the feed is filtered. By increasing the linear velocity the tendency of such materials to settle out and block the solution flow is reduced. In the treatment of solutions containing multivalent ions (for example, calcium, magnesium, sulfate and carbonate) it is frequently found that precipitates may form as the demineralization proceeds. Generally, such precipitates form in the concentrating chambers (where the solubility is exceeded) although they may also form in the diluting chambers. It is found that the tendency of such precipitates to be formed and to settle out within the unit is reduced if a high rate of flow of solution is maintained.

The passage of current through the solution and membranes of the apparatus results in an increase in temperature and consequent formation of bubbles of air dissolved in the liquid. These bubbles are frequently caught up in the narrow membrane interspacing and may form "vapor locks" which tend to prevent flow of solution through the particular chambers affected. Thus, the presence of sediment or scale, and the formation of precipitates and air bubbles may partially or completely block the passage of solution through a chamber. If such a chamber is a diluting chamber in the generally preferred case of parallel flow of solution through the diluting chambers (described in detail in the copending application of William E. Katz and Norman W. Rosenberg, Serial No. 307,302, filed August 30, 1952), now Patent No. 2,694,680, the decrease in flow rate will be readily taken up by the other diluting chambers since the total flow will be divided among many chambers. However, the same electric current will pass through all the diluting chambers and as a consequence the solution in the blocked chamber will be demineralized to a substantially greater extent than that in the other chambers, thereby resulting in increased resistance (and hence increased power consumption), decreased current efficiency and serious pH changes. The blocking of passages may be minimized by increasing the flow rate. It is believed that the assistance provided by the increased flow rate is due to the increased pressure drop across the chambers, which will be applied to the blocking material as the flow rate decreases in the chambers.

It is also found that at higher flow rates the rate of flow through each chamber tends to be equalized in the case where the flow is in parallel through the chambers. This may also be ascribed to the increased pressure drop.

The pressure drop may be increased in a number of ways, for example, by decreasing the intermembrane spacing, by providing a tortuous flow of solution through the chambers (resulting in a decreased cross-sectional area to flow and an increased length of flow). However, these expedients, by decreasing solution spacing, increase the tendency of gas or solids to be retained in the chambers. The rate of feed of solution may be increased to provide increased pressure. However, since the current may not be increased above a certain value (relative to the solution concentration) without resulting in low current efficiency, higher resistance, increased power costs and serious pH changes, it will not be practical to achieve the same extent of demineralization in the unit.

An object, therefore, of the present invention is to increase the efficiency with which salt may be electrically transferred through selectively permeable membranes in apparatus of the type described.

Another object of the invention is to facilitate the treatment or demineralization of ion containing solutions such as sea water, brackish water and various salt containing solutions encountered in industrial operation.

Another object is to increase the relative production rate of electrical apparatus for removing ions from solution by selective ion migration without increasing the power consumption disproportionately.

It is now found that the permissible current density may be increased, the extent of demineralization increased, the capacity of a given unit increased, the blocking of chambers decreased, and the flow of solution equalized among the chambers by recycling or recirculating a substantial portion of the effluent from diluting chambers to the influent to the diluting chambers.

By providing means for recirculating a portion of the effluent diluted solution the concentration of the influent solution is reduced and simultaneously the velocity of the solution passing between and in contact with the membranes is increased. In consequence, the permselectivity of the membranes is increased above that which would be found for the membranes in contact with solution of the concentration of the influent (especially for influent solutions of high concentration), and polarization at the membrane solution interface is reduced. It accordingly becomes possible to operate the apparatus at increased output ratio, i. e. at increased current densities.

These and other objects and features of the invention will be more readily understood and appreciated from the following detailed description of preferred embodiments thereof selected for purposes of illustration and shown in the accompanying drawings in which:

Figure 1 is a diagrammatic view in cross-section through a unit constructed in accordance with the invention, Figure 2 is a view in side elevation of a channelled spacer employed in the unit of Figure 1, Figure 3 shows diagrammatically a multi-chamber unit embodied in a system of this invention, and Figure 4 shows schematically a system of this invention employing a plurality of multi-chamber units.

Although for many operations it is advisable to employ a large number of chambers and cell units connected in parallel or in series or both, the unit shown in Figures 1 and 2 is entirely adequate for a complete understanding of the principles of the invention.

In the unit shown in Figs. 1 and 2 an anion permeable membrane 16 and a spaced parallel cation permeable membrane 18 are mounted within a container 10 of an insulating material such as glass or molded plastic, to define a diluting chamber 15 between the membranes and hydraulically separate rinsing chambers 17 and 19 surrounding the membranes. A rinse inlet 12 leads into the rinsing chamber 17 at one side of the membranes and a rinse outlet 14 discharges from the other rinsing chamber 19 while the two chambers are interconnected by a conduit 13, so that a rinse solution may be circulated either continuously or intermittently through the rinsing chambers.

The two membranes 16 and 18 are separated, and the flow of solution in the diluting chamber 15 is controlled, by a thin flat spacer member cut out at its central region to form a channel 25 of tortuous configuration and relatively narrow width so that a solution flowing in the channel is caused to course back and forth between and in contact with the membranes. An influent conduit 26 connects with one end of the channel 25, and an effluent conduit 28 connects with the other end, as best shown in Fig. 2.

To provide for recycling of treated solution, the effluent conduit 28 connects into a pump 30 which discharges into a T conduit 32. Of the two other ends of the T conduit one discharges through a control valve 34 into a recycle conduit 36 that leads back to the influent 26, while the other discharges through a valve 38 to be collected or further treated. By adjustment of the two valves 34 and 38 the desired fraction of effluent from the diluting chamber 15 may be recycled and combined with the incoming solution in the influent 26.

To complete the apparatus one of a pair of electrodes 40 and 42 are provided within each of the rinsing chambers 17 and 19. In operation the electrode 40 in the rinsing chamber 17 contacting the anion permeable membrane 16 is the anode while the other electrode 42 is the cathode.

In operation, a solution from which electrolyte is to be removed is introduced through the influent conduit 26 into the diluting chamber 15 and removed through the effluent conduit 28 from which it is pumped into the T section 32. The valves 34 and 38 are adjusted so that a fraction of the effluent is passed through the recycle conduit 36 back to the influent conduit 26 and combined with the incoming solution. An electrolytic solution to receive the removed electrolyte is circulated through the rinsing chambers 17 and 19, being introduced through rinse influent 12 and withdrawn through rinse effluent 14.

When the fluid flow conditions have been established a direct electric current is passed in series through the cell unit, with the electrode 40 being the anode. Anions of the dissolved electrolyte in the solution in the diluting chamber are thus caused to migrate through the anion permeable membrane 16 toward the anode and into the anodic rinsing chamber 17, while cations of the dissolved electrolyte migrate in the opposite direction into the cathodic rinsing chamber 19.

The countermigration of cations and anions into the rinsing chamber from the anode rinsing chamber and cathode rinsing chamber is prevented by the selectively permeable characteristics of the membranes. These membranes consist preferably of synthetic organic resinous materials of extreme insolubility to which are bonded dissociable ionic groups, acid groups for cation permeable membranes and basic groups for anion permeable membranes. A list of references to such membranes and their preparation is contained in the copending application of William E. Katz and Norman W. Rosenberg, Serial No. 300,302, filed July 22, 1952.

In preferred applications of this invention the electrolytic cell unit consists of many pairs of alternate anion and cation permeable membranes defining between them alternate concentrating and diluting chambers, with electrodes provided in the two terminal chambers. Such a cell unit is described in detail in the above mentioned copending application of Katz and Rosenberg, Serial No. 300,302, filed July 22, 1952.

An embodiment of this invention utilizing such a cell unit is shown schematically in Fig. 3. The cell unit consists in general of a container 50 divided into parallel alternating diluting chambers 52 and concentrating chambers 54 by alternating membranes K selectively permeable to cations and membranes A selectively permeable to anions. Electrodes 56 and 58 are provided at the ends of the container 8, and between each electrode and the ends of the battery of diluting and concentrating chambers 52 and 54 is situated an additional membrane $K_1$ (preferably cation permeable) defining electrode chambers 60 and washing chambers 62. A vent 64 in each electrode chamber 60 allows gases generated by electrolysis to escape from the cell. The washing chamber 62 and electrode chambers 60 do not function directly in the concentrating and diluting process, but are provided to minimize contamination of the solutions in the concentrating and diluting chambers by the products of electrolysis.

The diluting chambers 52 and concentrating chambers 54 are separately fed, preferably in parallel for mutually countercurrent flow, through conduits 66 and 68 respectively and the solutions are removed through conduits 70 and 72 respectively. The washing chambers 62 and electrode chambers 60 are each separately connected in series by influent conduits 74 and 76 respectively, connecting conduits 78 and 80 respectively and effluent conduits 82 and 84 respectively. The dilute effluent conduit 70 connects through a pump 86 into a T section, one leg of which discharges through a flow control valve 88 to the dilute product outlet and the other leg connects through a flow control valve 90 into a recycle conduit 92 that connects into the dilute influent conduit 66.

In operation, separate streams of electrolytic solutions to be diluted and concentrated are introduced into the diluting chambers 52 and concentrating chambers 54 through the dilute influent conduit 66 and concentrate influent conduit 68 respectively, and the separate streams are withdrawn through the dilute effluent conduit 70 and the concentrate effluent conduit 72 respectively. A washing stream of the solution to be diluted is passed through the washing chambers 62 through the conduits 74, 78 and 82 and an electrolytically conductive solution is passed through the electrode chambers 60 through the conduits 76, 80 and 84. An electric current is then passed through the cell so that the electrode 58 on the anion permeable membrane side of the diluting chambers 52 is the anode, thus to cause cations to cross the cation permeable barriers K in migration toward the cathode and anions to cross the anion permeable membranes A in migration toward the anode. Thereby, each diluting chamber 52 becomes depleted in its electrolyte content, while the alternating concentrating chambers 54 receive this electrolyte. The current is conducted to the battery of concentrating and diluting chambers 52 and 54 through the solutions in the electrode chambers 60 and the solutions in the washing chambers 62 with negligible contamination of the solutions being treated by products of electrolysis formed at the electrodes. The washing chambers 62 not only separate the terminal concentrating and diluting chambers 54 and 52 from the electrode chambers 60, but they also receive cations from the terminal diluting chamber 52, while supplying cations to the terminal concentrating chamber 54. It is for this reason, desirable that the same solution as that being diluted is circulated through the washing chambers 62.

To provide for recycling a fraction of the dilute product in accordance with this invention, the pump 86 in the dilute effluent conduit 70 is controlled to boost the pressure of the effluent dilute solution above that of the influent dilute solution, and the valves 88 and 90 are adjusted so that the desired fraction of effluent dilute solution is caused to flow through the recycle conduit 92 back into the dilute influent conduit 66, there to mix with the influent solution to be diluted.

In a typical operation, a unit of the type described above with reference to Figure 3 was used to concentrate and dilute simultaneously, an aqueous solution 0.155 N in sodium chloride to remove half of the dissolved electrolyte from the diluted stream. The unit was constructed with 20 diluting chambers defined between alternating anion and cation permeable membranes, each having an effective current carrying area of 200 sq. cm. Without recycling any of the diluted effluent 6.9 cu. cm. per second of the solution could be demineralized 50% under steady state conditions without substantially impairing the current efficiency. By recycling 50% of the effluent from the diluting chambers, however, 8.7 cu. cm. per second of the solution could be demineralized 50% without impairing the current efficiency. By current efficiency in this application it is meant the number of equivalents of salt that is transferred per chamber in each cell, for each equivalent of current (96,000 amperes-seconds) passed through the chamber. The operating conditions are shown in Table I.

Table I

|  | No Recycle | 50% Recycle |
| --- | --- | --- |
| Flow Rates, cc./sec.: |  |  |
| Dilute Influent— |  |  |
| To system | 6.9 | 8.7 |
| To dil. chambers | 6.9 | 17.4 |
| Dilute Effluent— |  |  |
| From System | 6.8 | 8.6 |
| From dil. chambers | 6.8 | 17.3 |
| Recycle |  | 8.7 |
| Conc. Influent | 1.8 | 2.3 |
| Conc. Effluent | 1.9 | 2.4 |
| Concentrations, Normality: |  |  |
| Dilute Influent— |  |  |
| To system | 0.155 | 0.155 |
| To dil. chambers | 0.155 | 0.112 |
| Dilute Effluent— |  |  |
| From system | 0.075 | 0.075 |
| From dil. chambers | 0.075 | 0.075 |
| Conc. Influent | 0.258 | 0.258 |
| Conc. Effluent | 0.54 | 0.54 |
| Current, amperes | 4.00 | 4.67 |
| Power, Watts | 58 | 82 |
| Current Efficiency, percent | 70 | 75 |

In operations where it is desired to remove substantially all of the electrolyte from a relatively concentrated solution as for instance, in the production of potable water from sea water, it is advantageous to use a number of concentrating and diluting cell units connected in hydraulic series as shown diagrammatically in Figure 4. Five cell units 100, 102, 104, 106 and 108, each having a set of diluting chambers schematically represented as D (corresponding to the chambers 52 shown in Figure 3) and a set of concentrating chambers schematically represented as C (which correspond to the chambers 54 in Figure 3) are connected with their diluting chambers in hydraulic series by means of dilute influent conduit 110 connecting conduits 112, 114, 116 and 118 and dilute effluent conduit 120. The concentrating solution is fed into the first unit 100 through concentrate influent conduit 122 and is discharged through concentrate effluent conduit 124. The concentrating chambers C of the remaining units 102, 104, 106 and 108 are fed in the order of flow opposite that of the diluting solution with a fraction of the dilute effluent by reflux conduit 126 leading from the dilute effluent conduit 120 into the concentrating chamber C of the last unit 108 from which the effluent concentrate solution is passed in series through the concentrating chamber C of the three intermediate units 102, 104 and 106 by connecting conduits 128, 130 and 132. From the second unit 102, the effluent concentrating solution discharges through an effluent conduit 134.

In order that a fraction of the diluted product may be combined with the influent to the diluting chambers, a recycle conduit 136 connecting between the dilute effluent conduit 120 and the dilute influent conduit 110 is provided. Pumps and valves (not shown) are also provided as required to maintain and control the desired flow of solutions throughout.

It will be understood that each of the concentrating and diluting cell units includes electrodes, and connections therefor, and also if desired, electrode chambers and washing chambers and conduit means for flowing solutions through them in the manner described above in connection with Figure 3.

The system shown in Figure 4 also features the use of a fraction of the diluted effluent as part of the solution to be concentrated in the concentrating chambers as described in the copending application of William E. Katz and Norman W. Rosenberg, Serial No. 300,302, filed July 22, 1952. The copending application of William E. Katz and Norman W. Rosenberg, Serial No. 307,302, filed August 30, 1952, now Patent No. 2,694,680, also discloses features that may be advantageously incorporated in systems employing a plurality of concentrating and diluting cell units connected in hydraulic series.

A system of the type shown in Fig. 4 was used to reduce the salt concentration of an aqueous solution from 0.62 N (a concentration roughly equivalent to that of sea water) to 0.009 N. Each diluting chamber in each cell unit was bounded by membranes having an effective current carrying area of 200 square centimeters. The number of diluting chambers in each cell unit was as follows:

| Cell unit | Ref. No. in Fig. 4 | No. Dil. Chambers |
|---|---|---|
| 1 | 100 | 92 |
| 2 | 102 | 45 |
| 3 | 104 | 36 |
| 4 | 106 | 32 |
| 5 | 108 | 26 |

Under steady state conditions 7.6 cc./sec. of the 0.62 N NaCl solution were mixed with 7.9 cc./sec. of 0.009 N NaCl solution from the dilute effluent, and passed in series through the diluting chambers. From the effluent dilute solution, in addition to the 7.9 cc./sec. utilized as recycle, 1.7 cc./sec. were passed through the concentrating chambers of Cell Units 5, 4, 3 and 2, in series. A separate stream of 0.62 N NaCl solution was fed to the concentrating chambers of the Cell Unit 1 at a rate of 3.5 cc./sec. In each unit the concentrating and diluting solutions were flowed in parallel through the concentrating and diluting chambers respectively in mutually opposite directions. The advantages of utilizing parallel flow of solution through the chambers of each of several units connected in series are described in the copending application of William E. Katz and Norman W. Rosenberg, Serial No. 307,302, filed August 30, 1952, now Patent No. 2,694,680.

The operating conditions of the system are reported in Table II.

Table II

| | Cell Unit | | | | | System |
|---|---|---|---|---|---|---|
| | 1 | 2 | 3 | 4 | 5 | |
| Flow Rates, cc./sec.: | | | | | | |
| Diluting Chambers— | | | | | | |
| Influent | 15.5 | 15.0 | 14.8 | 14.7 | 14.6 | 7.6 |
| Effluent | 15.0 | 14.8 | 14.7 | 14.6 | 14.6 | 5.0 |
| Conc. Chambers— | | | | | | |
| Influent | 3.5 | 1.9 | 1.8 | 1.7 | 1.7 | 3.5 |
| Effluent | 4.0 | 2.1 | 1.9 | 1.8 | 1.7 | 6.1 |
| Concentrations, Normality: | | | | | | |
| Diluting Chambers— | | | | | | |
| Influent | 0.31 | 0.16 | 0.075 | 0.038 | 0.019 | 0.62 |
| Effluent | 0.16 | 0.075 | 0.038 | 0.019 | 0.009 | 0.009 |
| Concentrating Chambers— | | | | | | |
| Influent | 0.62 | 0.53 | 0.24 | 0.09 | 0.009 | 0.62 |
| Effluent | 1.16 | 1.05 | 0.53 | 0.24 | 0.991 | 1.12 |
| Current Efficiency, Percent | 60 | 70 | 75 | 75 | 95 | |
| Current, Amperes | 4.5 | 4.1 | 2.1 | 1.1 | 0.6 | |
| Power, Watts | 244 | 124 | 37 | 14 | 6 | 425 |
| Kwh./1,000 gal. | | | | | | 85 |

Although full advantage of this invention is realized when the dilute solution is recirculated to reduce the concentration of the solution entering the diluting chambers and at the same time to increase the volume and linear rates of flow, several of the advantages of this invention may also be realized by recirculating the concentrated solution. Recirculating the effluent concentrated solution to combine it with the influent solution to the concentrating chambers increases the volume and linear rates of flow and thereby minimizes the settling of precipitate, blocking by air bubbles and polarization, although the concentration of the solution is not decreased. However, in cases where this solution is of relatively low concentration the advantages of recirculating it are appreciable. Even where this solution becomes concentrated with electrolyte to the point of precipitation, recirculating the solution after filtering out precipitated solids to increase the rate of flow is frequently more advantageous than operating at a lower flow rate.

This invention has been described in detail with reference to specific preferred embodiments thereof, but it is contemplated that modification thereto will occur to those skilled in the art, and that such modifications may be made without departing from the scope of the invention.

Having thus disclosed our invention and described in detail preferred embodiments thereof, we claim and desire to secure by Letters Patent:

1. Apparatus for treating electrolytic solutions comprising a pair of spaced hydraulically impermeable membranes, one anion selectively permeable and the other cation selectively permeable, a thin flat spacer member having a central channel region of tortuous configuration between and in contact with said membranes, influent conduit means for introducing a solution into one end of said channel, effluent conduit means for withdrawing solution from the other end of said channel, means for contacting the outboard surfaces of said membranes with a liquid, means for passing an electric current in series across said membranes and channel region, recycle conduit means connecting between said effluent conduit means and said influent conduit means, means for flowing a fraction of solution in said effluent conduit means through said recycle conduit means and means for withdrawing the remaining fraction of said solution.

2. Apparatus for treating electrolytic solutions comprising a plurality of hydraulically impermeable alternating anion selectively permeable membranes and cation selectively permeable membranes, thin flat spacer members having central channel regions of tortuous configurations between and in contact with said membranes thus defining between them alternating diluting chambers and concentrating chambers, influent conduit means for introducing a solution into the diluting chambers, effluent conduit means for withdrawing solution from the diluting chambers, flow means for flowing a solution through the concentrating chambers, means for passing an electric current in series across said membranes and chambers, recycle conduit means connecting between said effluent conduit means and said influent conduit means, means for flowing a fraction of solution in said effluent conduit means through said recycle conduit means and means for withdrawing the remaining fraction of said solution.

3. Apparatus for treating electrolytic solutions comprising a plurality of hydraulically impermeable alternating anion selectively permeable membranes and cation selectively permeable membranes, thin flat spacer members having central channel regions of tortuous configurations between and in contact with said membranes thus defining between them alternating diluting chambers and concentrating chambers, influent conduit means connecting in parallel with the diluting chambers, effluent conduit means for withdrawing solution from the diluting chambers, flow means for flowing a solution in parallel through the concentrating chambers, means for passing an electric current in series across said membranes and chambers, recycle conduit means connecting between said effluent conduit means and said influent conduit means, means for flowing a fraction of solution in said effluent conduit means through said recycle conduit means and means for withdrawing the remaining fraction of said solution.

4. The method of treating an electrolytic solution comprising flowing a first stream of the solution in a tortuous path between and in contact with an anion permeable membrane and a cation permeable membrane, passing a direct electric current in series across said membranes and solution, dividing the effluent of said first stream of solution into a second stream and a third stream, combining only the second stream with the first stream and flowing them together between and in contact with said membranes, and withdrawing said third stream.

5. The method of treating an electrolytic solution comprising flowing a first stream of solution in tortuous paths through alternate chambers defined between a plurality of spaced alternating hydraulically impermeable anion selectively permeable membranes and cation selectively permeable membranes, flowing a second electrolytic solution in tortuous paths through the remaining chambers defined by said membranes, passing a direct electric current in series across said membranes and chambers defined between them, dividing said first stream after it has flowed through said alternate chambers into a third stream and a fourth stream, combining only the third stream with the first stream and flowing them together through said alternate chambers, and withdrawing said fourth stream.

6. The method of treating an electrolytic solution comprising flowing a first stream of solution through alternate chambers defined between a plurality of spaced alternating hydraulically impermeable anion selectively permeable and cation selectively permeable membranes, flowing a second electrolytic solution through the remaining chambers defined by said membranes, passing a direct electric current in series across said membranes and chambers defined between them in a direction to cause anions in the solution in said alternate chambers to migrate toward the anion permeable membranes bounding said chambers, dividing said first stream after it has flowed through said alternate chambers into a third stream and a fourth stream, combining only the third stream with the first stream and flowing them together through said alternate chambers, and withdrawing said fourth stream.

7. The method of treating an electrolytic solution comprising flowing a first stream of the solution in parallel through alternate chambers defined between a plurality of spaced alternating hydraulically impermeable anion selectively permeable membranes and cation selectively permeable membranes, flowing a second electrolytic solution through the remaining chambers defined by said membranes, passing a direct electric current in series across said membranes and chambers defined between them, dividing said first stream after it has flowed through said alternate chambers into a third stream and a fourth stream, combining only the third stream with the first stream and flowing them together through said alternate chambers and withdrawing said fourth stream.

8. The method of treating an electrolytic solution comprising flowing a first stream of the solution in parallel through alternate chambers defined between a plurality of spaced alternating hydraulically impermeable anion selectively permeable membranes and cation selectively permeable membranes, flowing a second electrolytic solution in parallel in the general direction opposite that of the first stream through the remaining chambers defined by said membranes, passing a direct electric current in series across said membranes and chambers defined between them, dividing said first stream after it has flowed through said alternate chambers into a third stream and a fourth stream, combining only the third stream with the first stream and flowing them together through said alternate chambers, and withdrawing said fourth stream.

9. The method of treating an electrolytic solution comprising flowing a first stream of solution in parallel through alternate chambers defined between a plurality of spaced alternating hydraulically impermeable anion selectively permeable and cation selectively permeable membranes, flowing a second electrolytic solution through the remaining chambers defined by said membranes, passing a direct electric current in series across said membranes and chambers defined between them in a direction to cause anions in the solution in said alternate chambers to migrate toward the anion permeable membranes bounding said chambers, dividing said first stream after it has flowed through said alternate chambers into a third stream and a fourth stream, combining only the third stream with the first stream and flowing them together through said alternate chambers, and withdrawing said fourth stream.

10. The method of treating an electrolytic solution comprising flowing a first stream of solution in parallel through alternate chambers defined between a plurality of spaced alternating hydraulically impermeable anion selectively permeable and cation selectively permeable membranes, flowing a second electrolytic solution in parallel in the general direction opposite that of the first stream through the remaining chambers defined by said membranes, passing a direct electric current in series across said membranes and chambers defined between them in a direction to cause anions in the solution in said alternate chambers to migrate toward the anion permeable membranes bounding said chambers, dividing said first stream after it has flowed through said alternate chambers into a third stream and a fourth stream, combining only the third stream with the first stream and flowing them together through said alternate chambers, and withdrawing said fourth stream.

11. The method of treating electrolytic solutions comprising flowing a first stream of the solution in a tortuous path through the diluting chambers of a plurality of cell units each having alternating diluting chambers and concentrating chambers defined between alternating hydraulically impermeable anion selectively permeable membranes and cation selectively permeable membranes, the flow of solution in each cell unit being in parallel to the diluting chambers therein and in series from unit to unit, flowing an electrolytic solution in a tortuous path through the concentrating chambers of each of the cell units, passing a direct electric current through each cell unit in series across the membranes and chambers defined between them in the direction to cause anions in the solution in the diluting chambers to migrate toward the anion permeable membranes bounding said chambers, dividing said first stream after it has flowed through said cell units into a third stream and a fourth stream, combining only the third stream with the first stream and flowing them together through said units, and withdrawing said fourth stream.

References Cited in the file of this patent

UNITED STATES PATENTS

| Number | Name | Date |
| --- | --- | --- |
| 1,986,920 | Cross | Jan. 8, 1935 |
| 2,694,680 | Katz et al. | Nov. 16, 1954 |
| 2,708,658 | Rosenberg | May 17, 1955 |

FOREIGN PATENTS

| Number | Country | Date |
| --- | --- | --- |
| 682,703 | Great Britain | Nov. 12, 1952 |
| 383,666 | Germany | Oct. 16, 1923 |
| 689,674 | France | June 2, 1930 |